UNITED STATES PATENT OFFICE.

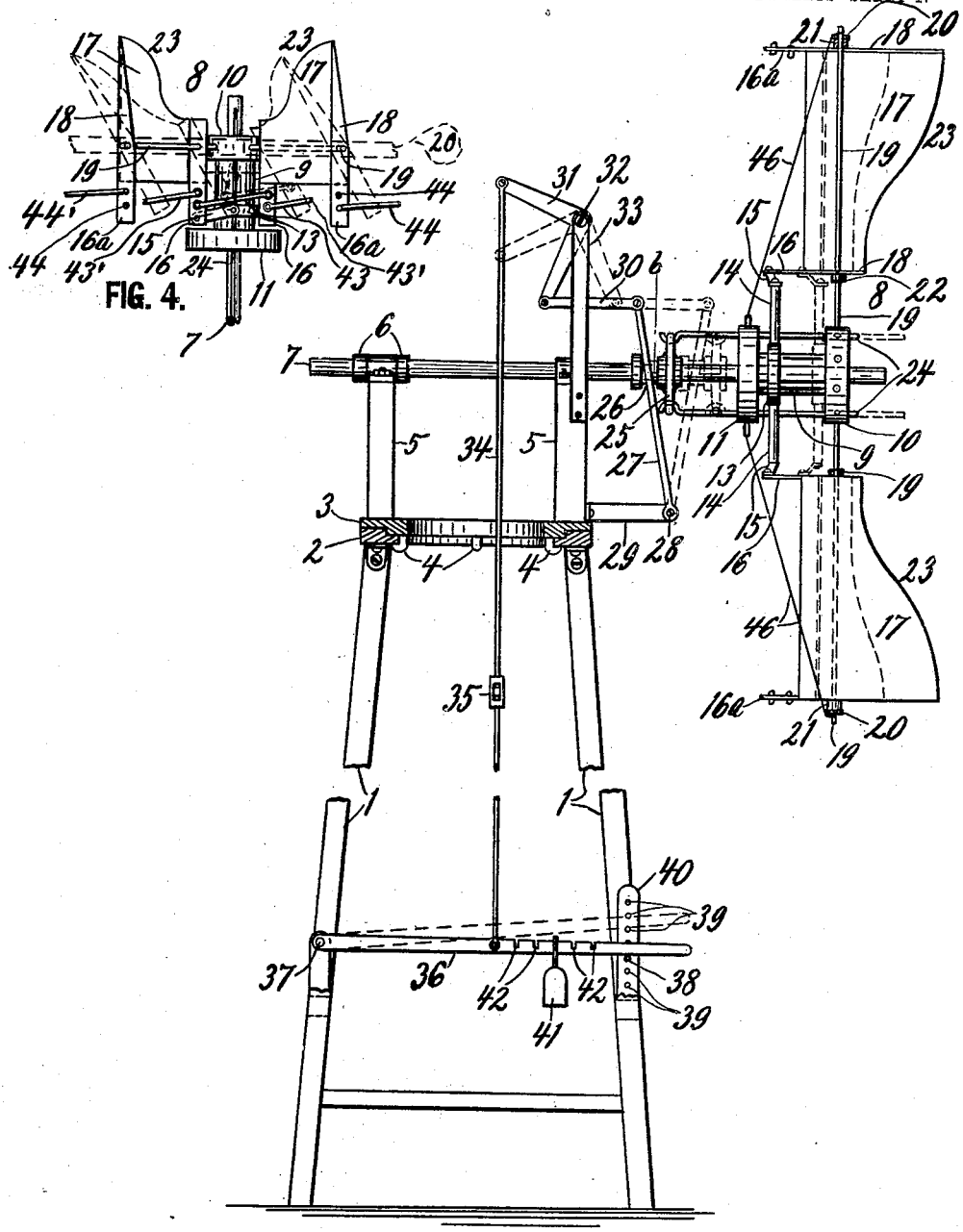

THOMAS O. HARSTAD, OF WINDOM, MINNESOTA.

WINDMILL.

No. 917,942.  Specification of Letters Patent.  Patented April 13, 1909.

Application filed July 18, 1908. Serial No. 444,220.

*To all whom it may concern:*

Be it known that I, THOMAS O. HARSTAD, a citizen of the United States, residing at Windom, in the county of Cottonwood and State of Minnesota, have invented a new and useful Windmill, of which the following is a specification.

My invention relates to improvements in wind-mills; and the object is to provide a durable and efficient windmill of cheap construction.

Figure 3:
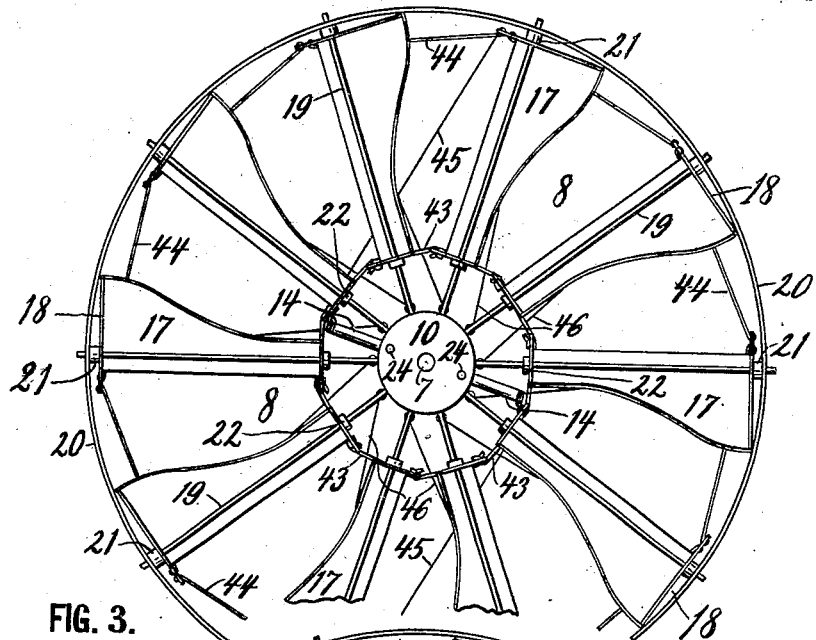
Figure 2:
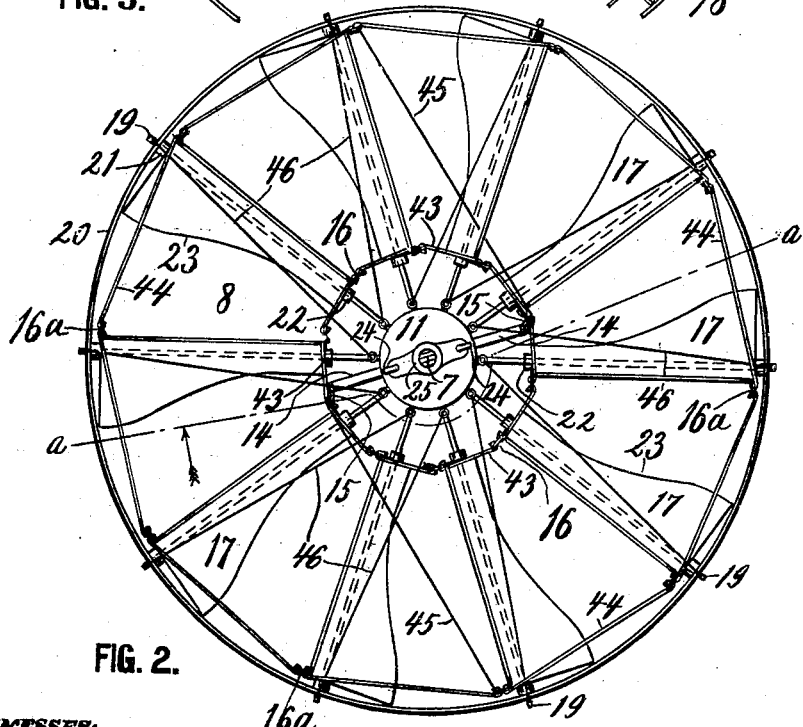

In the accompanying drawings Figure 1 is a partly sectional side elevation of a windmill embodying my invention, the wheel being shown in section about as on the line $a$—$a$ in Fig. 2. Fig. 2 is the entire wind wheel shown as from the left in Fig. 1 the shaft being intersected at the point $b$. Fig. 3 is a rear view of Fig. 2. Fig. 4 is an edge view of a portion of the wind wheel, looking radially toward the center, two of the wings and adjacent parts being shown.

Referring to the drawing by reference numerals, 1 designates the tower of the windmill. At the top thereof is fixed a metallic ring or frame 2 in which a saddle 3 is guided to rotate in a horizontal plane and is retained in place by hooks 4 formed on it and grasping below the frame ring.

The saddle is provided with bearings 5 in which is journaled and retained by collars 6 the main shaft 7 of the wind wheel 8. This wheel has a sleeve like hub 9 fixed on the shaft and formed with two collars 10 and 11 through which slide two rods 24, fixed in a yoke 13 which loosely embraces the sleeve part of the hub, and has two opposite radial arms 14 connected by links 15 to rocker arms 16, projecting from the inner ends of two of the opposite sails or wings 17 of the wheel. Of said wings there may be any desired number. Each wing is made of sheet metal and stiffened transversely by having across each end secured a cleat 18, which cleats also form the bearings of the wings by being journaled on spokes or arms 19, radiating from the collar 10. Each cleat has also one end projected beyond the wing where said ends serve as rocker arms 16 and 16ª for feathering the wings, as will presently be more fully described. The outer ends of the spokes 19 are bracingly connected together by a ring 20, between which and the wings, collars 21 may be interposed to hold the wings clear of the ring; and other collars 22 meet the inner ends of the wings.

Each wing has its front or wind-cutting edge disposed parallel to and comparatively near the spoke, while the opposite or rear edge 23 is of an ogee form so as to broaden considerably the main outer portion of the wing rearward of the spoke on which it is pivoted. The object of this arrangement is to give the wing so much more surface in rear than in front of the spoke that the wind will always tend to turn the wing into idle position; and by applying certain adjustable means for controlling such tendency, be able to regulate conveniently the speed and power of the wind wheel. Said controlling and regulating means are as follows: Secured in the yoke 14 and sliding in the collars 10 and 11 are two parallel rods 24 to whose front ends is connected a collar 25 sliding on the main shaft 7 and having an annular groove 26, engaged by a lever 27 which has its lower end pivoted at 28 to an arm 29 of the saddle and its upper end connected by a link 30 to a bell-crank lever 31, fulcrumed at 32 to another frame arm 33 of the saddle. From the upper arm of the bell-crank lever is suspended a rod 34, which extends downwardly through a large opening in the saddle, is formed with a swivel joint 35, and has its lower end connected to a horizontal lever 36, which has one end pivoted at 37 to the tower and its other end normally resting upon a peg 38, which is movable into the various holes 39 provided in a suitable post or arm 40 of the tower, and upon said lever hangs a weight 41, which is movable to the several notches 42 in the lever. While only two of the rocker arms 16 are connected by links 15 with the yoke 14, all the arms 16 are actuated by the yoke because they are connected together by link rods 43, and in similar manner the rocker arms 16ª near the outer ends of the wings are connected together by link rods 44 and thus operated in unison by two long obliquely extending link rods 45 connecting two of the outer rocker arms with the inner rocker arms 16.

In Fig. 4 every other link rod is marked a prime so as to distinguish these from the others and explain that each rod is connected alternately with one end near the end of the arm and the other end farther in on the next arm than the adjacent end of the next link rod, so that each rod occupies a slightly diagonal position and connects so to say one long and one short rocker arm. The same is the case with the arms 16ª and their link rods, This arrangement of the links provides for an enlargement of the circle formed by the links every time the rocker arms swing their ends from their normal radial distance from the center of the wheel to the longer radial distance caused by tilting the wing into working position.

46 are braces connecting the ring 20 with the hub collar 11 so as to brace the spokes against the wind.

In the operation of the machine if the peg 38 be moved high enough up the wings will all be turned edgewise to the wind and the wheel will stand still. This position of the wings may be caused by the rod 34 and its connection with the wings if the rod is stiff enough to push on the mechanism, but if the rod be only a wire or cable the wings are turned into idle position by the wind. To start the wheel when wind is blowing, the peg 38 is moved so far down that the weight 41 will turn the wings into more or less oblique position to wind until the speed is attained for the work to be performed by the wheel. If the wind blows unevenly the weight and lever will rise for each extra strong gust and thus let the surplus wind pass the wings. If the wind be strong in a general sense the peg 38 is put higher up in proportion, and if extra great working power is required of the wheel the weight 41 is moved toward the end of the lever to resist tilting of the wings, while for light work the weight will be moved in the opposite direction. No vane is employed on this wind wheel as the wind will always hold the wheel to one side of the tower and thereby the main shaft in line with the wind. The power is transmitted from the shaft 7 to working machinery by any of the ordinary means (not shown) used for similar wind engines.

Having thus described my invention, what I claim is:

1. In a wind-operated machine the combination with a suitable tower and a horizontally rotary, centrally open saddle mounted thereon, of a horizontal shaft journaled in the saddle, a wind wheel fixed on the shaft beyond the saddle and comprising a hub with radial arms or spokes, wings journaled on the spokes and having rocker arms at both ends, said wings having each a larger portion in rear of the spoke than in front thereof where the wing meets the wind, a horizontal lever pivoted in the lower portion of the tower, an adjustable weight thereon, a swivel-jointed rod extending upwardly from the lever through and above the saddle, a bell-crank lever mounted on the saddle and having one arm connected to said rod, and means connecting the other arm of the bell crank lever with some of the rocker arms of the wings, and links connecting the rocker arms of all the wings together to cause them to tilt in unison, said link rods between the rocker arms having each one end pivoted nearer to the free end of the rocker arm than the other end of the link is on the rocker arm of the next wing.

2. In a wind-operated machine the combination with a suitable tower and a horizontally rotatory, centrally open saddle mounted thereon, of a horizontal shaft journaled in the saddle, a wind wheel fixed on the shaft beyond the saddle and comprising a hub with radial arms or spokes, wings journaled on the spokes and having rocker arms, said wings having each a larger portion in rear of the spoke than in front thereof where the wing meets the wind, a horizontal lever pivoted in the lower portion of the tower, an adjustable weight thereon, a swivel-jointed rod extending upwardly from the lever through and above the saddle, a bell-crank lever mounted on the saddle and having one arm connected to said rod, means connecting the other arm of the bell crank lever with some of the rocker arms of the wings, and links connecting the rocker arms of all the wings together to cause them to tilt in unison, and a vertically adjustable support for the weighted lever, said connecting means between the wings and the bell crank lever comprising a slidable collar on the main shaft and having an annular groove, a lever engaging the groove and having one end pivoted to the saddle and the other end link connected to the bell crank lever, parallel rods connected with the sliding collar and slidingly guided on the wheel hub, a yoke loosely embracing the hub and being secured to the sliding rods, and links connecting the ends of the yoke with some of the rocker arms.

3. In a wind-operated machine the combination with a suitable tower and a horizontally rotatory, centrally open saddle mounted thereon, of a horizontal shaft journaled in the saddle, a wind wheel fixed on the shaft beyond the saddle and comprising a hub with radial arms or spokes, wings journaled on the spokes and having rocker arms, said wings having each a larger portion in rear of the spoke than in front thereof where the wing meets the wind, a horizontal lever pivoted in the lower portion of the tower, an adjustable weight thereon, a swivel-jointed rod extending upwardly from the lever through and above the saddle, a bell-crank lever mounted on the saddle and having one arm connected to said rod, means connecting the other arm of the bell crank lever with some of the rocker arms of the wings, and links connecting the rocker arms of all the wings together to cause them to tilt in unison, and a vertically adjustable support for the weighted lever, said connecting means between the wings and the bell crank lever comprising a slidable collar on the main shaft and having an annular groove, a lever engaging the groove and having one end pivoted to the saddle and the other end link connected to the bell crank lever, parallel rods connected with the sliding collar and slidingly guided on the wheel hub, a yoke loosely embracing the hub and being secured to the sliding rods, and links connecting the ends of the yoke with some of the rocker arms, said wings having such rocker arms at both ends so as to be more firmly and precisely tilted or feathered.

In testimony whereof I affix my signature, in presence of two witnesses.

THOMAS O. HARSTAD.

Witnesses:
A. M. CARLSEN,
C. J. GARDEEN.